United States Patent
Jayakar et al.

(10) Patent No.: US 9,599,012 B2
(45) Date of Patent: Mar. 21, 2017

(54) CHARGE AIR COOLER COVER AND TURBOCHARGER BRACKET

(71) Applicant: GENERAL ELECTRIC COMPANY, Schenectady, NY (US)

(72) Inventors: Vijayaselvan Jayakar, Bangalore (IN); John Dowell, Grove City, PA (US); Charles B Atz, New Castle, PA (US); Pratap Subhash Shitole, Bangalore (IN); Gary Szuch, Oxford, MI (US); Trent A Larson, Rochester, MI (US); Scott Snyder, Valencia, PA (US); Shirish Bhide, Troy, MI (US)

(73) Assignee: General Electric Company, Schenectady, NY (US)

( * ) Notice: Subject to any disclaimer, the term of this patent is extended or adjusted under 35 U.S.C. 154(b) by 538 days.

(21) Appl. No.: 13/940,591

(22) Filed: Jul. 12, 2013

(65) Prior Publication Data

US 2014/0182285 A1 Jul. 3, 2014

Related U.S. Application Data

(60) Provisional application No. 61/747,324, filed on Dec. 30, 2012.

(51) Int. Cl.
| | | |
|---|---|---|
| F02B 29/04 | (2006.01) | |
| F02B 37/00 | (2006.01) | |
| F28F 9/02 | (2006.01) | |
| F28F 9/26 | (2006.01) | |
| F02B 37/013 | (2006.01) | |

(52) U.S. Cl.
CPC ........ *F02B 29/0412* (2013.01); *F02B 29/045* (2013.01); *F02B 37/004* (2013.01); *F02B 37/013* (2013.01); *F28F 9/0268* (2013.01); *F02B 29/0462* (2013.01);
(Continued)

(58) Field of Classification Search
CPC ... F02M 31/20; F01N 13/1816; F02B 37/002; F02B 37/18; F02B 37/007; F02B 29/04–29/0493; F02B 33/44; F02B 37/00–37/24; Y02T 10/144; Y02T 10/146; F28F 9/0268
USPC .... 60/605.3, 597–612; 123/563; 165/52, 66, 165/174, 195–161, 159–161
See application file for complete search history.

(56) References Cited

U.S. PATENT DOCUMENTS 4,452,216 A * 6/1984 Patchen, II ......... F02B 29/0462
123/545
4,693,084 A * 9/1987 Ahrens ........................... 60/599
(Continued)

FOREIGN PATENT DOCUMENTS

CN 202081967 12/2011
JP WO 2011132608 A1 * 10/2011 ......... F28D 1/05366

*Primary Examiner* — Thomas Denion
*Assistant Examiner* — Laert Dounis
(74) *Attorney, Agent, or Firm* — John A. Kramer; Global Patent Operation

(57) ABSTRACT

A charge air cooler cover includes a nozzle configured for connection to an outlet of a compressor for receiving charge air, a tray configured for connection to an inlet of a charge air cooler, and a plenum leading from the nozzle to a plurality of passages defined by a plurality of ribs. The plurality of passages connects the plenum to the tray. The ribs and the tray are arranged to achieve substantially uniform charge air velocity across the inlet of the charge air cooler, in at least one mode of operation.

6 Claims, 10 Drawing Sheets

(52) U.S. Cl.
CPC ....... *F28F 2009/029* (2013.01); *Y02T 10/144* (2013.01); *Y02T 10/146* (2013.01)

(56) References Cited

U.S. PATENT DOCUMENTS

| | | | |
|---|---|---|---|
| 4,716,735 A * | 1/1988 | Ruf et al. .................... | 60/605.3 |
| 5,103,641 A * | 4/1992 | Maus ...................... | F01N 3/281 |
| | | | 422/171 |
| 5,392,604 A * | 2/1995 | Nikula et al. ................ | 60/605.3 |
| 6,682,321 B1 * | 1/2004 | Mukherjee et al. ......... | 417/407 |
| 6,745,568 B1 | 6/2004 | Squires | |
| 7,810,466 B2 | 10/2010 | Preimesberger | |
| 2003/0111210 A1 * | 6/2003 | Tsujita ................. | F28D 7/1653 |
| | | | 165/51 |
| 2007/0062679 A1 * | 3/2007 | Agee ........................ | F28F 9/02 |
| | | | 165/158 |
| 2007/0175612 A1 * | 8/2007 | Hendrix ............. | F02B 29/0418 |
| | | | 165/101 |
| 2008/0190592 A1 * | 8/2008 | Bruck ...................... | F01N 3/02 |
| | | | 165/159 |
| 2013/0025838 A1 * | 1/2013 | Kato .................. | F28D 1/05366 |
| | | | 165/173 |
| 2013/0220289 A1 * | 8/2013 | Maceroni et al. ....... | 123/568.12 |
| 2014/0109857 A1 * | 4/2014 | Vallee ................ | F02B 29/0462 |
| | | | 123/184.21 |

\* cited by examiner

CHARGE AIR COOLER COVER AND TURBOCHARGER BRACKET

CROSS-REFERENCE TO RELATED APPLICATIONS

This U.S. patent application claims priority to U.S. provisional patent application Ser. No. 61/747,324 filed on Dec. 30, 2012, which is incorporated herein by reference in its entirety.

BACKGROUND

Technical Field

Embodiments of the invention relate generally to internal combustion engines, and more particularly to turbocharged engines. Other embodiments relate to diesel engines and other engines with multi-stage turbocharger arrangements.

Discussion of Art

Large ships such as container ships, tankers, bulk carriers, and cruise ships typically carry two types of diesel engines: main propulsion engines and auxiliary engines. The main propulsion engines on most large ships are "Category 3" marine diesel engines, which can stand over three stories tall and run the length of two school buses. Auxiliary engines on large ships typically range in size from small portable generators to locomotive-size engines.

Category 3 engines generate significant emissions of PM 2.5 (diesel soot), SO2 (sulfur dioxide), and NOx (nitrous oxides). All these substances are recognized as pollutants by some governmental agencies. For example, the U.S. Environmental Protection Agency (EPA) estimated that, in 2009, Category 3 vessels contributed almost 913,000 tons (10 percent) to the U.S. national mobile source NOx inventory, about 71,000 tons (24 percent) to the mobile source diesel PM 2.5 inventory, and nearly 597,000 tons (80 percent) to the mobile source SO2 inventory. Accordingly, the EPA adopted standards that will apply to Category 3 (C3) engines installed on U.S. vessels and to marine diesel fuels produced and distributed in the United States. The adopted standards include limitations on NOx emissions.

NOx emissions vary according to engine speed, combustion temperature, and the quantity of fuel burned. Lower speeds and higher combustion temperatures tend to raise the amount of NOx produced per quantity of fuel burned. As will be appreciated, low speed and high combustion temperature can be desirable characteristics of high-load internal combustion engines such as marine diesel propulsion engines. Therefore, the simplest path for reducing NOx emissions is to reduce the quantity of fuel burned per unit of useful power.

Turbochargers can be useful for enhancing fuel efficiency of piston-cylinder engines, by augmenting the mass and pressure of air inhaled into each cylinder during its intake stroke. However, turbochargers for large (e.g., Category 3) engines can be difficult to fit into the machinery space provided for the engines and their interfacing equipment.

As will be appreciated, it is desirable to minimize the machinery space within large ships, which are built to carry cargo or otherwise. Therefore, it is desirable to provide a marine diesel turbocharger arrangement that satisfies forthcoming EPA or other governmental standards while not requiring excessive machinery space.

BRIEF DESCRIPTION

In embodiments, a charge air cooler cover comprises a nozzle configured for connection to an outlet of a compressor (e.g., the compressor is part of a turbocharger that includes the compressor and a turbine) for receiving charge air. The charge air cooler cover further comprises a tray configured for connection to an inlet of a charge air cooler, and a plenum leading from the nozzle to a plurality of passages defined by a plurality of ribs. The plurality of passages connects the plenum to the tray. The ribs, passages, and tray are provided and configured for controlling how charge air is presented to the inlet of the charge air cooler. For example, according to aspects, the ribs and the tray are arranged to achieve substantially uniform charge air velocity across the inlet of the charge air cooler, in at least one mode of operation of an engine system that includes the compressor, charge air cooler, and chair air cooler cover.

In other embodiments, a turbocharger mounting bracket includes a base plate and a flange protruding from the base plate. A lubricant supply passage is defined by and extends through the flange, and a lubricant drain passage is defined by and extends through the flange.

In other embodiments, an engine (e.g., a marine diesel engine or other diesel engine) comprises a frame, a plurality of cylinders mounted in the frame and connected between an intake manifold and an exhaust manifold, a turbocharger, and a bracket mounting the turbocharger to the frame. The bracket comprises a base plate and a flange protruding from the base plate, with a lubricant supply passage formed through the flange and with a lubricant drain passage formed through the flange. The turbocharger is fluidly coupled to the lubricant supply passage and to the lubricant drain passage of the bracket for receiving oil or other lubricant from a lubricant supply and returning the oil or other lubricant to the lubricant supply, respectively. (For example, the lubricant supply might be a lubrication system that provides lubricant to the engine generally.)

The engine may also include a charge air cooler cover connected from an outlet of a compressor of the turbocharger to an inlet of a charge air cooler. The charge air cooler cover may include a nozzle configured for connection to the outlet of the compressor for receiving charge air, a tray configured for connection to the inlet of the charge air cooler, and a plenum leading from the nozzle to a plurality of passages defined by a plurality of ribs. The plurality of passages connects the plenum to the tray. The ribs and the tray may be arranged to achieve substantially uniform charge air velocity across the inlet of the charge air cooler, in at least one mode of operation of the engine. For example, the ribs may be arranged to substantially evenly distribute charge air flow among the passages, and the tray may be configured to deliver the charge air flow from the passages to the inlet of the charge air cooler.

DRAWINGS

The present invention will be better understood from reading the following description of non-limiting embodiments, with reference to the attached drawings, wherein below:

Figure 1:
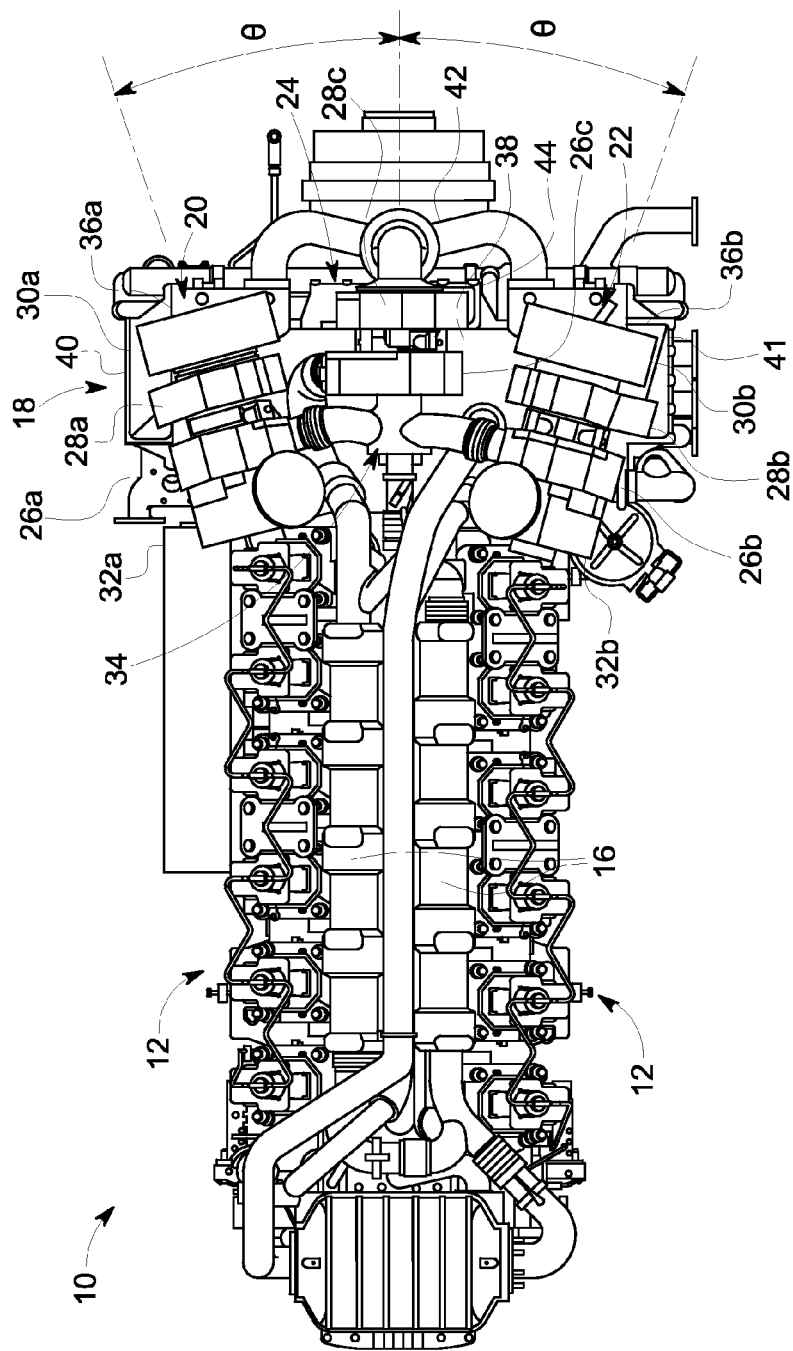
FIG. 1 shows a plan view of an engine (e.g., marine diesel engine or other diesel engine) having a two stage turbocharger arrangement.
Figure 2:
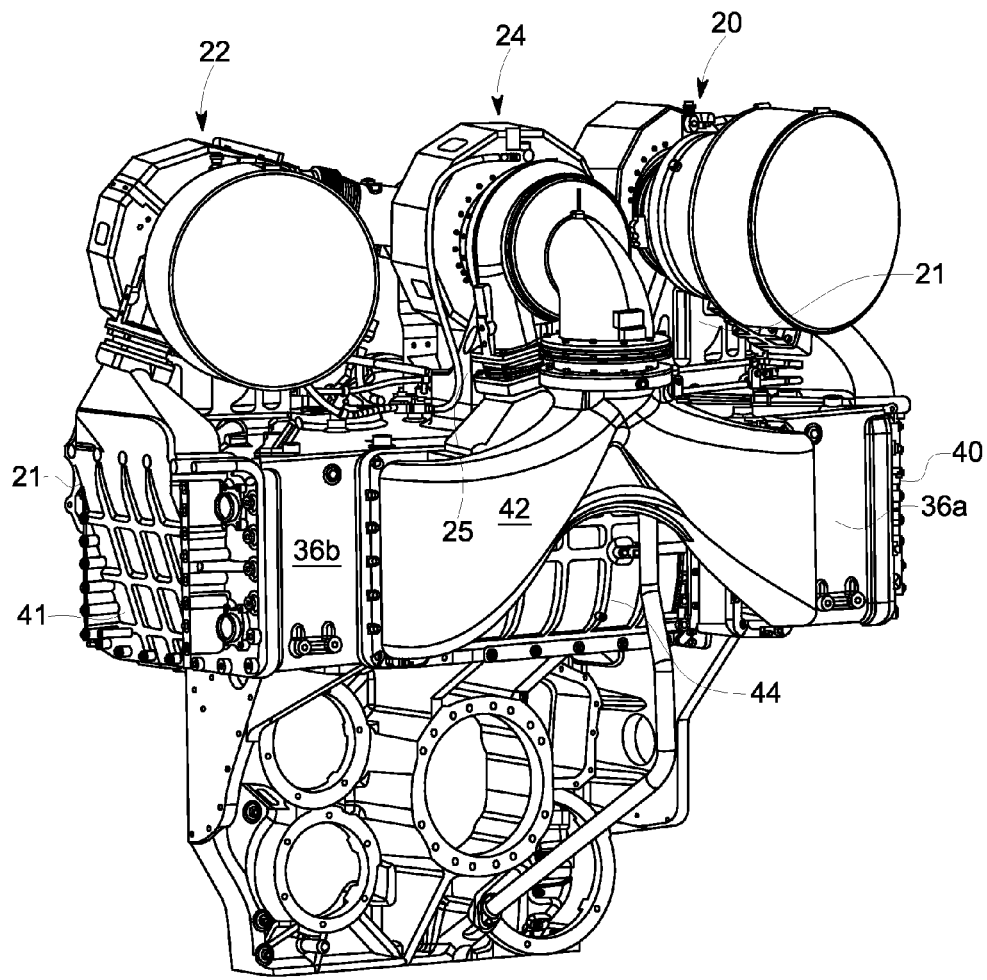
FIG. 2 shows in perspective view a front end of the engine and turbocharger arrangement of FIG. 1.

FIG. 3, comprising views 3A-3B, shows in cutaway view a first intercooler cover of the engine shown in FIGS. 1 and 2, according to a first embodiment of the invention."

FIG. 4, comprising views 4A-4B, shows in cutaway view a second intercooler cover of the engine shown in FIGS. 1 and 2, according to a second embodiment of the invention.

Figure 5:
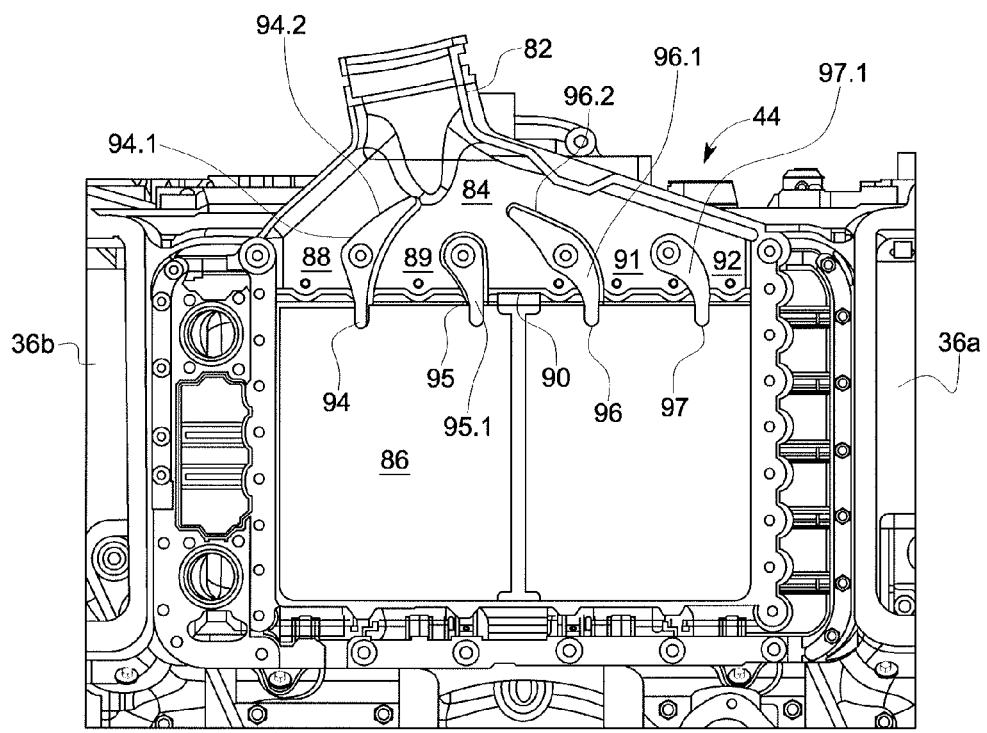

FIG. 5 shows in cutaway view an aftercooler cover of the engine shown in FIGS. 1 and 2, according to a third embodiment of the invention.

FIG. 6, comprising views 6A-6B, shows a first turbocharger bracket of the engine shown in FIGS. 1 and 2, according to a fourth embodiment of the invention.

FIG. 7, comprising views 7A-7C, shows a second turbocharger bracket of the engine shown in FIGS. 1 and 2, according to a fifth embodiment of the invention.

Figure 8:
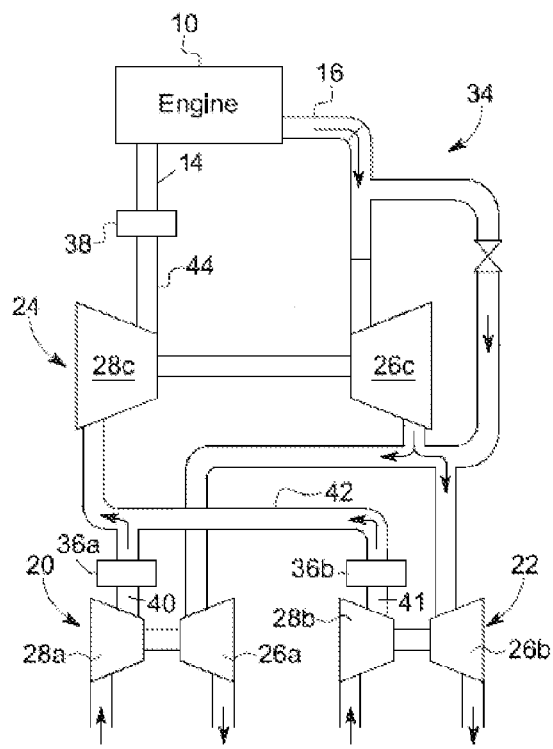

FIG. 8 schematically illustrates a flow arrangement of a two-stage turbocharger, according to embodiments.

DETAILED DESCRIPTION

Reference will be made below in detail to exemplary embodiments of the invention, examples of which are illustrated in the accompanying drawings. Wherever possible, the same reference characters used throughout the drawings refer to the same or like parts.

FIGS. 1 and 2 show plan and perspective views of an engine 10 (e.g., a marine diesel engine or other diesel engine), which includes one or more banks of cylinders 12. Each bank of cylinders receives intake air from an intake manifold (generally shown as connected to the outlet of the aftercooler 38; see also 14 in FIG. 8) and discharges exhaust gases to an exhaust manifold 16. The intake manifold receives intake air that is turbocharged to greater than atmospheric pressure by a two-stage turbocharger arrangement 18. The turbocharger arrangement 18 is driven by exhaust gas from the exhaust manifold(s) 16.

The turbocharger arrangement 18 includes first and second low pressure (LP) turbochargers 20, 22 as well as a high pressure (HP) turbocharger 24. Thus, the turbocharger arrangement 18 is a two-stage arrangement, with the LP turbochargers providing a first stage of compression and a second stage of expansion, and the HP turbocharger providing a second stage of compression and a first stage of expansion. "High" pressure and "low" pressure refer to relative pressure levels at which the turbochargers operate, that is, the low pressure turbochargers operate at a lower pressure than the high pressure turbocharger, which operates at a higher pressure than the low pressure turbochargers. FIG. 8 schematically illustrates a flow arrangement of the turbochargers 20, 22, 24. Each of the turbochargers 20, 22, 24 includes a respective turbine 26 (26a, 26b, 26c), which works on expansion of the exhaust gases, and a respective compressor 28 (28a, 28b, 28c), which works on compression of the intake air. That is, the respective turbine and compressor of each turbocharger are interconnected by a turbocharger shaft. The turbine is driven by exhaust gas, which causes the compressor to rotate for compressing intake air. The two LP turbochargers 20, 22 also include respective intake filters 30a, 30b and exhaust covers 32a, 32b. In operation, the turbines 26a, 26b, 26c receive exhaust gases from the exhaust manifold 16 via an inlet/interstage duct assembly (IIDA) 34, and the compressors 28a, 28b, 28c discharge intake air to the intake manifold via intercoolers 36a, 36b and an aftercooler 38. Intake air is communicated from each LP turbocharger compressor 28a, 28b to a corresponding intercooler 36a, 36b via an intercooler duct cover 40 or 41, is communicated from the intercoolers 36a, 36b to the HP compressor 28c via a compressor interstage duct 42, and is communicated from the HP compressor 28c to the aftercooler 38 via an aftercooler duct cover 44. For reasons further discussed below, the HP turbocharger 24 is aligned in a vertical plane above a crankshaft axis of the engine 10, while the LP turbochargers 20, 22 are angled outward from the crankshaft axis at angles θ. In certain embodiments, the angle θ is chosen as fourteen (14) degrees in a horizontal plane.

As mentioned, the intercooler duct covers 40, 41 direct partly pressurized air flows from the LP compressors 28a, 28b into the intercoolers 36a, 36b. The intercooler duct covers 40, 41 have been discovered as regions where flow losses can be significantly reduced by shape optimization. Accordingly, the duct covers 40, 41 have been optimized as shown in FIGS. 3 and 4, respectively.

Figure 3A:
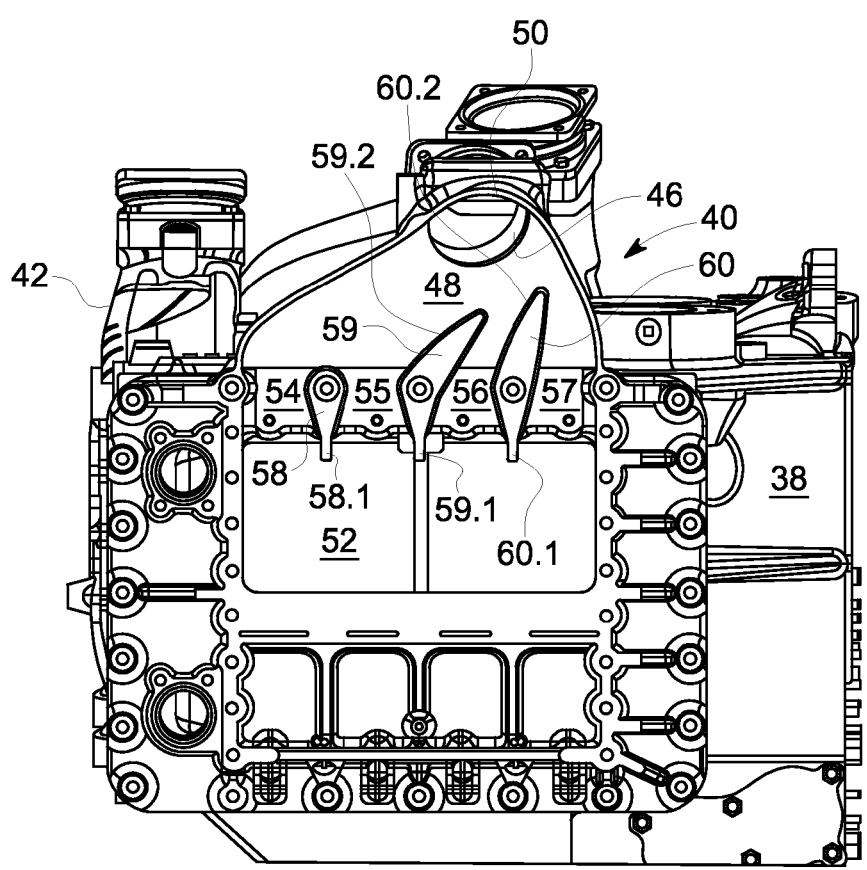
Figure 3B:
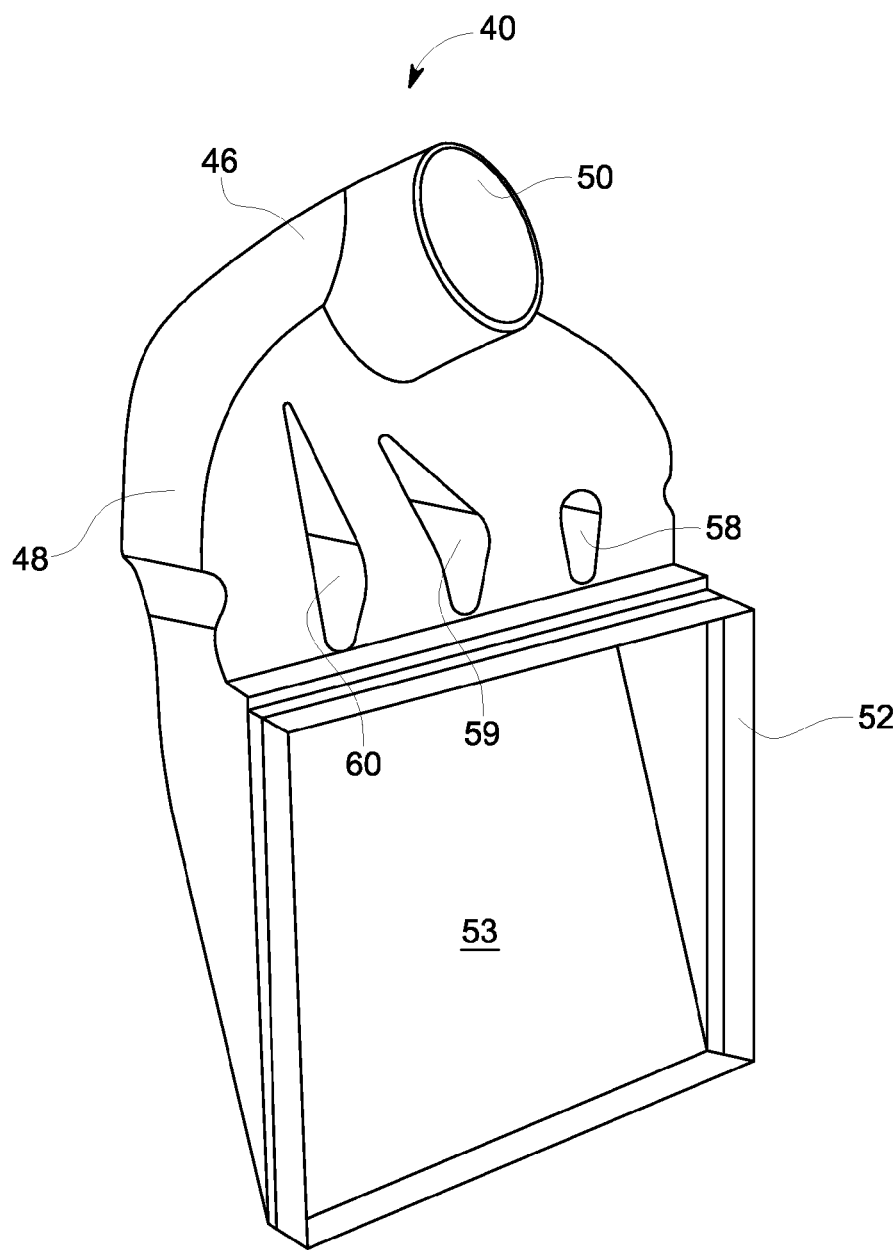

FIG. 3, comprising views 3A and 3B, shows the first intercooler duct cover 40, which includes a nozzle 46 leading from the first LP compressor 28a into a plenum 48. The nozzle 46 extends from the plenum 48 along an axis that is angled in both horizontal and vertical planes. In the horizontal plane the nozzle 46 is angled at the angle corresponding to the first LP compressor 28a, for example, fourteen (14) degrees from a line transverse the engine centerline. The nozzle 46 has a circular mouth 50, and flares outward from the mouth 50 toward the plenum 48. The plenum 48 connects with a tray 52 via several passages 54, 55, 56, 57, which are separated from each other by internal ribs 58, 59, 60. The tray 52 is defined by an outer panel 53 (shown in FIG. 3B), which is slanted to make the tray 52 progressively shallower from top to bottom so that the tray slopes toward the inlet of the adjacent charge air cooler (first intercooler 36a). The ribs 58, 59, 60 are configured to divert, proportion, and straighten or collimate the flow of air from the nozzle 46 toward the tray 52. In particular, the ribs 58, 59, 60 are arranged to achieve a substantially uniform distribution of flow velocity among the passages 54, 55, 56, 57, as further discussed below. Herein, "substantially uniform" means that computational fluid dynamic modeling indicates a minimum "uniformity index" for the flow velocity of no less than 75%. The uniformity index is calculated by mass averaged velocity measurement across an areal region, according to an equation such as the following:

$$UI = 1 - \frac{\sum A_i \sqrt{(u_i - \bar{u})^2}}{2A\bar{u}}$$

where "UI" represents uniformity index, u represents mass averaged velocity, ui represents velocity through subdivided area A total area of cross-section, and Ai represents an area of a cross-section of each sub division of the total area. Thus, a "substantially uniform distribution of flow velocity" means that most of the areal region will have velocity approximating the mass averaged velocity.

More particularly, the ribs 58, 59, 60 have differing profiles, which are described hereafter with reference to a lateral cross-sectional perspective in a plane parallel to the air flow direction, as shown in FIG. 3A. The first rib 58, disposed between the passages 54 and 55 that are furthest from a flow axis of the nozzle 46, has a first profile that includes a downward-extending straightener portion 58.1. The second rib 59, disposed between the passages 55 and 56, has a second profile that includes a downward-extending straightener portion 59.1 as well as an upward-extending deflector portion 59.2. The third rib 60, disposed between the passages 56 and 57 that most closely align with the flow axis of the nozzle 46, has a third profile that includes a downward-extending straightener portion 60.1 as well as an upward-extending deflector portion 60.2.

The straightener portions 58.1, 59.1, 60.1 extend substantially vertically, in other words, they are disposed to define the passages 54, 55, 56, 57 such that flow exiting from the passages will have substantially entirely downward velocity. The straightener portions 58.1, 59.1, 60.1 are shaped to define diverging portions of the passages 54, 55, 56, 57. At the lower edges of the straightener portions 58.1, 59.1, 60.1, each of the passages 54, 55, 56, 57 is considered to have a "flow area," which is an open area of the passage in a plane perpendicular to the generally vertical direction of flow. The straightener portions 58.1, 59.1, 60.1 are spaced across the general direction of flow so as to define differing flow areas of the passages 54, 55, 56, 57. The differing flow areas of the passages 54, 55, 56, 57 are set substantially proportional to the mass flows directed by the deflector portions 59.2, 60.2 toward each of the passages, as further discussed below.

The deflector portions 59.2, 60.2 extend generally lateral to the direction of flow from the nozzle 46 into the plenum 48. In other words, each deflector portion is angled across the flow of charge air into the plenum 48. The deflector portions 59.2, 60.2 are configured so as to proportion the charge air flow from the nozzle 46 into substantially equal mass flows to each of the passages 54, 55, 56, 57. In an embodiment, the deflector portion 59.2 is angled across the flow of charge air so as to deflect approximately 48% of this flow toward the passages 54 and 55. The deflector portion 60.2 is angled across the flow of charge air so as to divide the remaining 52% of flow into 32% toward passage 56 and 20% toward passage 57. Thus, each of the deflector portions may extend across the flow of charge air at any angle from parallel to orthogonal, according to the proportion of charge air intended to be deflected to either side of that deflector portion.

As the flow areas of the passages 54, 55, 56, 57 are set substantially proportional to the mass flows apportioned to the passages, this means that each of the passages 54, 55, 56, 57 has a substantially identical ratio of mass flow to flow area, thus, substantially the same average flow velocity as in each of the other passages. Thus, the charge air exits all of the passages into the tray 52 at substantially uniform flow velocity. This substantially uniform distribution of flow velocity among the passages 54, 55, 56, 57 into the tray 52, along with the progressive shallowing or slope of the tray 52, establish substantially uniform flow velocity throughout the tray 52 and the first intercooler 36a.

Figure 4A:
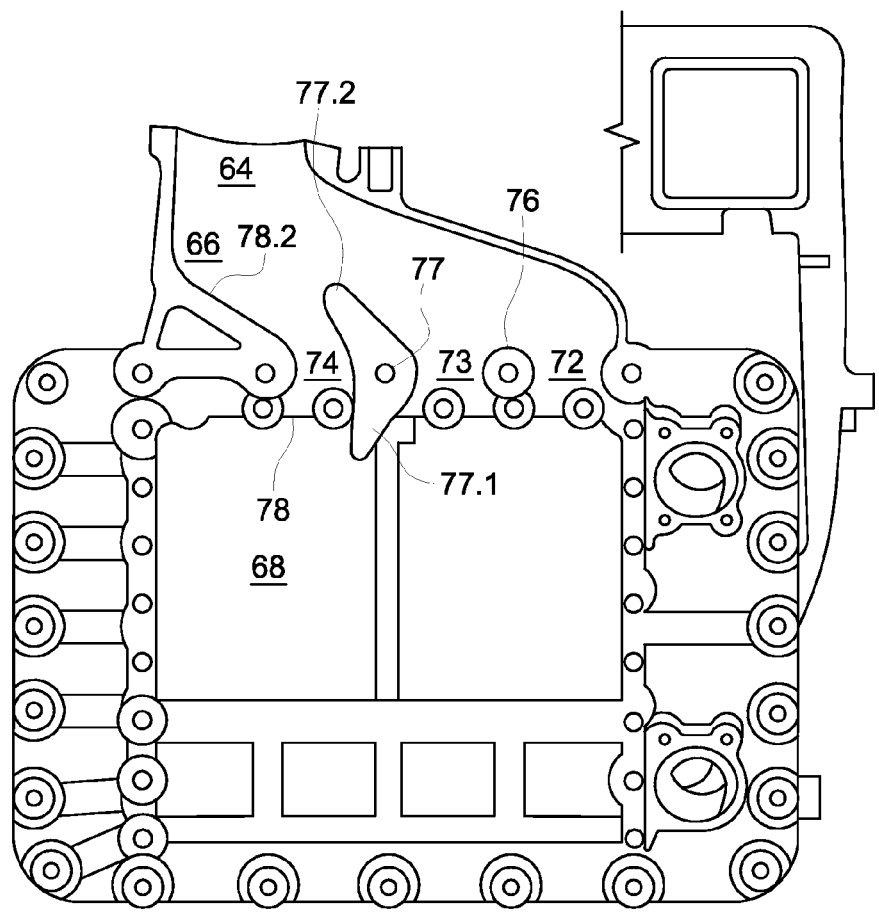
Figure 4B:
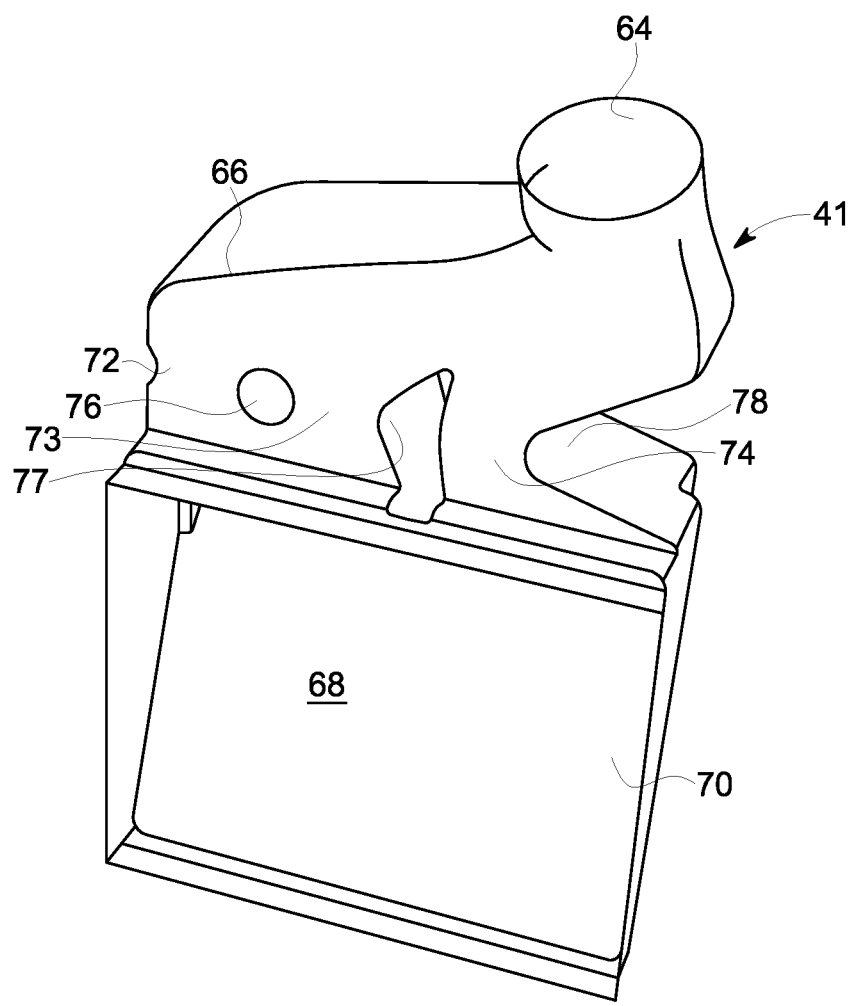

FIG. 4, comprising views 4A and 4B, shows the second intercooler duct cover 41, which includes a nozzle 64 leading from the second LP compressor 28b into a plenum 66. The nozzle 64 extends from the plenum 66 along an axis that is angled in both horizontal and vertical planes. In the horizontal plane the nozzle 64 is angled at the angle corresponding to the second LP compressor 28b, for example, fourteen (14) degrees from a line transverse the engine centerline. The nozzle 64 has a circular mouth, and flares outward from the mouth toward the plenum 66. The plenum 66 connects with a tray 68 via several passages 72, 73, 74, which are separated from each other by internal ribs 76, 77, 78. The ribs 76, 77, 78 are arranged to distribute charged air flow among the passages 72, 73, 74 so as to achieve substantially uniform velocity within the tray 68, substantially as discussed above with reference to the first intercooler duct cover 40. Each of the ribs 76, 77, 78 has a different profile in a plane generally parallel to the direction of flow from the nozzle 64 into the plenum 66 (i.e., in a plane as shown in FIGS. 4A-4B). For example, the first rib 76 has a generally circular profile. By contrast, the second rib 77 has an elongated profile, with a lower flow-straightening "straightener" portion 77.1 and an upper deflector portion 77.2. The straightener portion 77.1 extends generally vertically, while the deflector portion 77.2 is angled toward the nozzle 64. The third rib 78 includes an upper deflector portion 78.2 that merges with a wall of the plenum 66. Thus, the ribs 76, 77, 78 apportion charge air from the nozzle 64 among the passages 72, 73, 74. Each of the forward passages 72, 73 receives about one third of the total mass flow from the nozzle 64, while the rearward passage 74 receives the remaining one third of mass flow. The ribs 76, 77, 78 are disposed such that the passages 72, 73, 74 differ in flow area according to the mass flow apportioned to each passage by the ribs 76, 77, 78. The tray 68 has a slanted outer panel 70 so that the tray slopes toward the inlet of the adjacent charge air cooler (second intercooler 36b), such that there is substantially uniform flow velocity throughout the tray 68 and the second intercooler 36b.

As should be appreciated, in embodiments, the two intercooler duct covers 40, 41 (charge air cooler covers) have different configurations (e.g., different numbers of passages, differently configured ribs, and/or differently shaped trays), for providing the substantially uniform charge air velocity across the inlets of the respective charge air coolers to which they are attached, notwithstanding differences in where and how the covers are positioned in regards to other components in the system and/or that the covers may receive different flow velocities from the LP compressors. (It may be the case that although the flow into each charge air cooler is uniform, the flow velocities as between the two charge air coolers is different.) In other embodiments, the two intercooler duct covers 40, 41 (charge air cooler covers) have the same configuration.

FIG. 5 shows the aftercooler duct cover 44 (charge air cooler cover), which includes a nozzle 82 leading from the HP compressor 28c into a plenum 84. The plenum 84 is connected with a tray 86 by a plurality of passages 88, 89, 90, 91, 92, which are defined by a plurality of ribs 94, 95, 96, 97. The ribs 94, 95, 96, 97 are arranged to distribute charged air flow among the passages 88, 89, 90, 91, 92 for achieving substantially uniform velocity within the tray 86, substantially as discussed above with reference to the first intercooler duct cover 40. For example, the ribs 94 and 96 include upper deflector portions 94.2 and 96.2, which are angled toward an axis of the nozzle 82 so as to divert charge air flow from the axis laterally toward the outward passages 88, 91, 92. Further, the ribs 94, 95, 96, 97 include lower straightener portions 94.1, 95.1, 96.1, 97.1, which are spaced apart to define the passages 88, 89, 90, 91, 92 having different respective flow areas according to the mass flows apportioned to each passage by the ribs 94, 95, 96, 97. The tray 86 is arranged to be progressively shallower away from the plenum 84, so that the tray slopes toward the inlet of the adjacent charge air cooler (aftercooler 38). Accordingly, there is substantially uniform flow velocity throughout the tray 86 and the aftercooler 38.

Figure 6A:
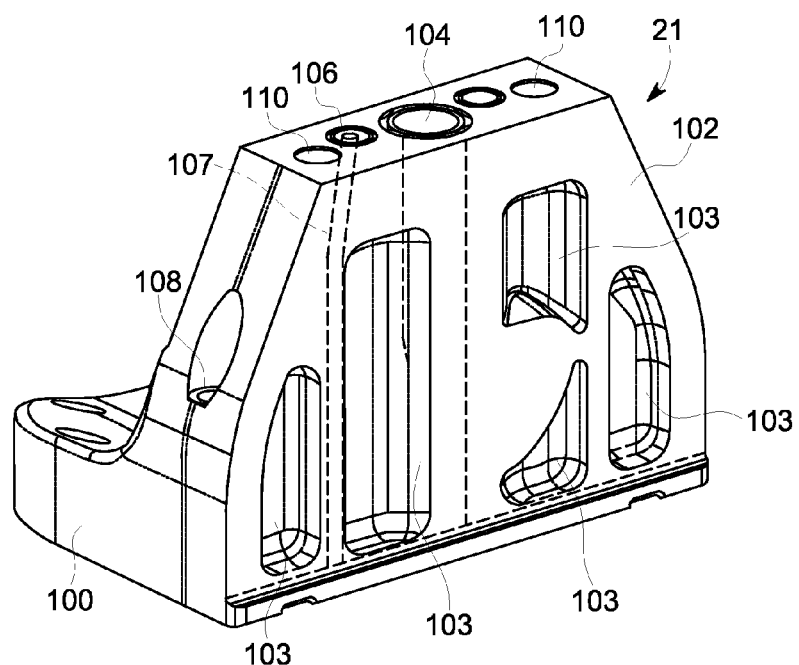
Figure 6B:
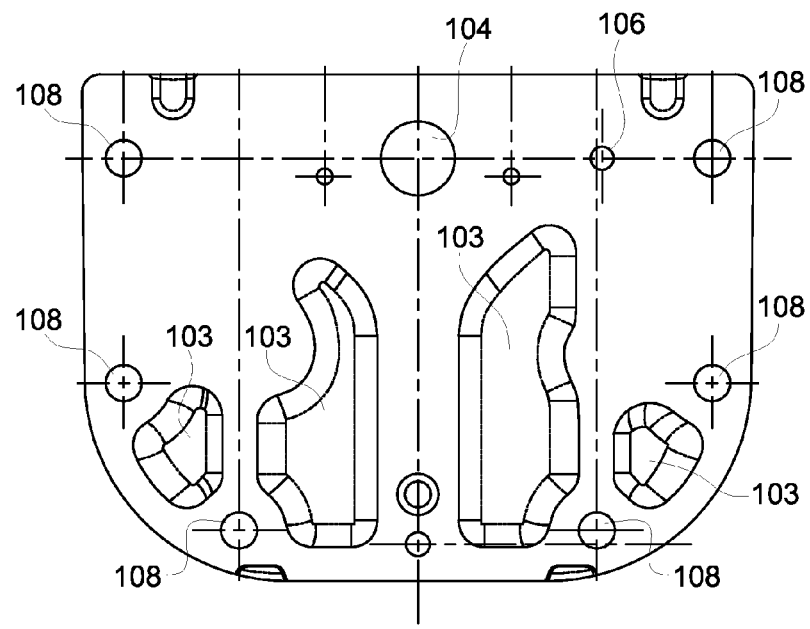

Referring to FIGS. 6A-6B, each of the LP turbochargers 20, 22 is mounted to the marine or other diesel engine or other engine 10 by one of the first turbocharger brackets 21. The first turbocharger bracket 21 includes a base plate 100 and a flange 102 that protrudes upward from the base plate. Within the bracket 21, a lubricant drain passage 104 and a lubricant supply passage 106 are defined, e.g., the lubricant supply passage and lubricant drain passage are defined by and extend through at least the flange. The lubricant supply passage and lubricant drain passage function to supply lubricant to the LP turbocharger mounted to the bracket.

In embodiments, the base plate 100 and the flange 102 include numerous indentations 103, which reduce the weight of the bracket 21. In other embodiments, additionally or alternatively, the lubricant drain passage 104 runs straight from top to bottom of the flange 102 for draining lubricant from the mounted turbocharger 20 or 22 to the engine 10. The lubricant supply passage 106 also runs from top to bottom of the flange 102 for supplying lubricant from the engine 10 to the mounted turbocharger 20 or 22. The lubricant supply passage 106 includes a slanted upper portion 107 for connecting a lubricant fitting of the mounted turbocharger 20 or 22 with a lubricant port of the engine 10. In addition to the lubricant passages 104, 106, the bracket 21 includes mounting holes 108 for bolting the bracket to the engine 10, as well as mounting holes 110 for bolting one of the LP turbochargers 20 or 22 onto the bracket 21.

Figure 7A:
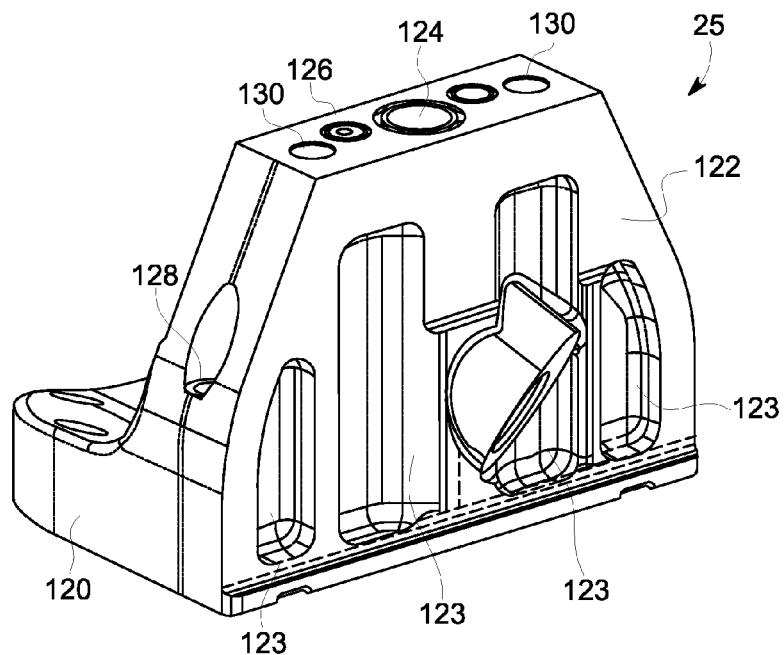
Figure 7B:
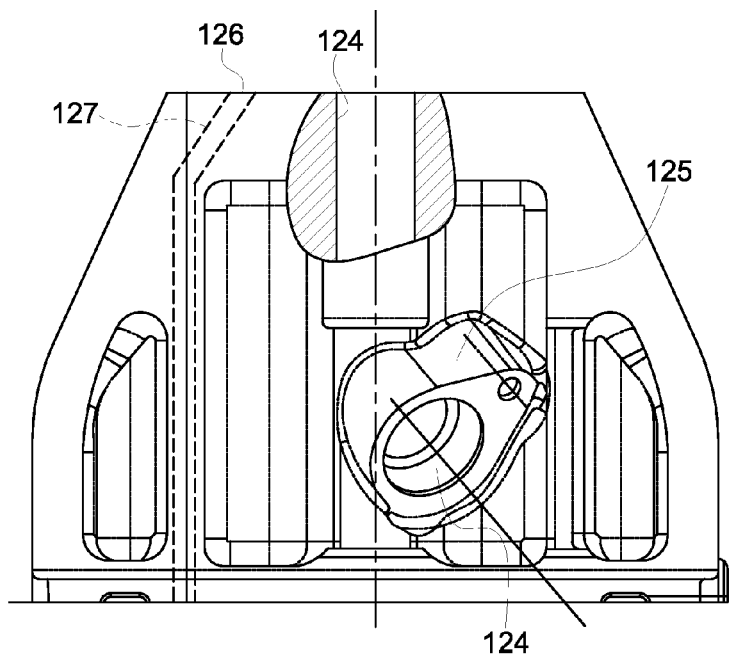
Figure 7C:
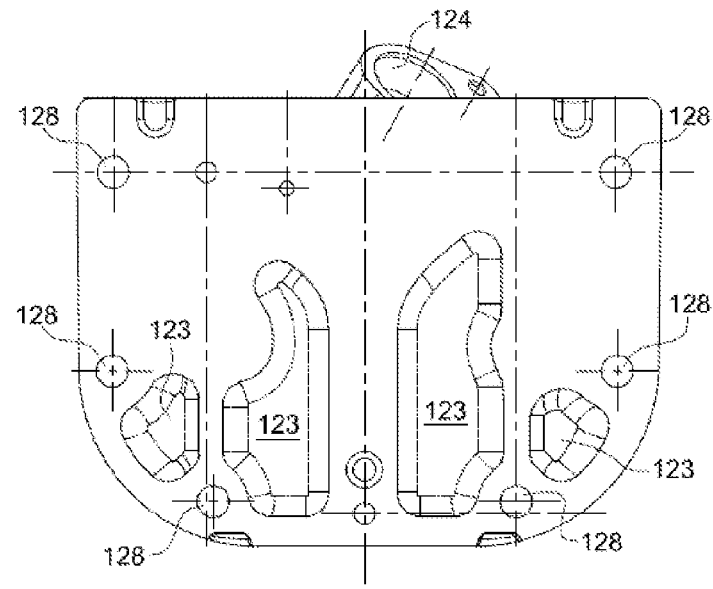

FIGS. 7A, 7B, 7C show the second turbocharger bracket 25, which mounts the HP turbocharger 24 onto the engine 10. The second turbocharger bracket 25 includes a base plate 120 and a flange 122 that protrudes upward from the base plate. Within the bracket 25, a lubricant drain passage 124 and a lubricant supply passage 126 are defined, for supplying lubricant to the HP turbocharger.

In embodiments, the base plate 120 and the flange 122 include numerous indentations 123, which reduce the weight of the bracket 25. In other embodiments, alternatively or additionally, the lubricant drain passage 124 runs from the top of the flange 122 to a spigot 125 that protrudes from the side of the flange 122. The lubricant supply passage 126 runs from top to bottom of the flange 122 and includes a slanted upper portion 127. In addition to the lubricant passages 124, 126, the bracket 25 includes mounting holes 128 for bolting the bracket to the engine 10, as well as mounting holes 130 for bolting the HP turbocharger 24 onto the bracket 25.

In embodiments, a charge air cooler cover comprises a nozzle configured for connection to an outlet of a compressor for receiving charge air, a tray configured for connection to an inlet of a charge air cooler, and a plenum leading from the nozzle to a plurality of passages defined by a plurality of ribs. The plurality of passages connects the plenum to the tray. The ribs, passages, and tray are provided and configured for controlling how charge air is presented to the inlet of the charge air cooler. For example, the ribs and the tray may be arranged to achieve substantially uniform charge air velocity across the inlet of the charge air cooler. In other embodiments, depending on the configuration of the charge air cooler, the ribs and the tray may be arranged to achieve a designated distribution of charge air velocity across the inlet of the charge air cooler that is non-uniform.

In other embodiments of the charge air cooler cover, the plurality of ribs define the plurality of passages to have differing flow areas, where the respective flow area of each passage depends on distance of that passage from the nozzle. For example, the passage furthest from the nozzle may be defined to have the largest flow area among the plurality of passages.

In other embodiments of the charge air cooler cover, the plurality of ribs define the plurality of passages to have differing flow areas. For example, a first of the plurality of passages furthest from the nozzle may be defined to have the largest flow area among the plurality of passages and a second of the plurality of passages closest to the nozzle may be defined to have the smallest flow area among the plurality of passages.

In another embodiment of the charge air cooler cover, the tray slopes inward from the plurality of passages across the inlet of the charge air cooler, such that the substantially uniform charge air velocity is achieved.

Another embodiment relates to a system comprising an engine, a charge air cooler cover, a turbocharger operably coupled to the engine and comprising a compressor and a turbine, and a charge air cooler. The charge air cooler is operably coupled to receive charge air from the compressor through the charge air cooler cover. The charge air cooler cover comprises a nozzle connected to an outlet of the compressor for receiving the charge air, a tray connected to an inlet of the charge air cooler, and a plenum leading from the nozzle to a plurality of passages defined by a plurality of ribs. The plurality of passages connects the plenum to the tray. The ribs, passages, and tray are provided and configured for controlling how the charge air is presented to the inlet of the charge air cooler. For example, in one embodiment, wherein in at least one mode of operation of the system where the charge air cooler cover receives the charge air from the compressor and channels it to the charge air cooler, the ribs and the tray of the charge air cooler cover achieve a substantially uniform charge air velocity across the inlet of the charge air cooler.

Another embodiment relates to a system comprising an engine, a first turbocharger operably coupled to the engine and comprising a first compressor and a first turbine, a second turbocharger operably coupled to the engine and comprising a second compressor and a second turbine, a first charge air cooler, a first charge air cooler cover, a second charge air cooler, and a second charge air cooler cover. The first charge air cooler is operably coupled to receive first charge air from the first compressor through the first charge air cooler cover. The second charge air cooler is operably coupled to receive second charge air from the second compressor through the second charge air cooler cover. The first charge air cooler cover comprises a first nozzle connected to an outlet of the first compressor for receiving the first charge air, a first tray connected to an inlet of the first charge air cooler, and a first plenum leading from the first nozzle to a first plurality of passages defined by a first plurality of ribs. The first plurality of passages connects the first plenum to the first tray. The second charge air cooler cover comprises a second nozzle connected to an outlet of the second compressor for receiving the second charge air, a second tray connected to an inlet of the second charge air cooler, and a second plenum leading from the second nozzle to a second plurality of passages defined by a second plurality of ribs. The second plurality of passages connects the second plenum to the second tray. The first charge air cooler cover and the second charge air cooler cover have different configurations from one another. For example, the first charge air cooler cover may be configured for controlling how the first charge air is presented to the inlet of the first charge air cooler in a first manner, and the second charge air cooler cover may be configured for controlling how the second charge air is presented to the inlet of the second charge air cooler in a different, second manner. (For examples of the different configurations, compare FIG. 3 to FIG. 4; other different configurations are possible depending on the particular engine system configuration, etc.)

Another embodiment relates to a turbocharger mounting bracket comprising a base plate and a flange protruding from the base plate. The flange defines a lubricant supply passage and a lubricant drain passage that extend through the flange.

In another embodiment of the turbocharger mounting bracket, the lubricant supply passage extends from top to bottom of the flange, and includes a slanted portion.

In another embodiment of the turbocharger mounting bracket, the lubricant drain passage extends from top to bottom of the flange.

In another embodiment of the turbocharger mounting bracket, the lubricant drain passage extends from the top of the flange to a spigot formed at the side of the flange.

Another embodiment relates to a system comprising an engine (e.g., diesel engine) and a turbocharger mounting bracket. The engine comprises a turbocharger, a frame, an intake manifold connected to the frame, an exhaust manifold connected to the frame, and a plurality of cylinders mounted in the frame and connected between the intake manifold and the exhaust manifold. The turbocharger mounting bracket comprises a base plate and a flange protruding from the base plate. The flange defines a lubricant supply passage and a lubricant drain passage that extend through the flange. The turbocharger mounting bracket is attached to the frame. The turbocharger is mounted to the turbocharger mounting bracket. The turbocharger is fluidly coupled to the lubricant supply passage and to the lubricant drain passage of the turbocharger mounting bracket for receiving lubricant from a lubricant supply (e.g., the engine may be the lubricant supply) and returning lubricant to the lubricant supply, respectively.

In another embodiment, the lubricant supply passage is fluidly coupled with a lubrication supply port of the turbocharger and the lubricant drain passage is fluidly coupled with a lubrication return port of the turbocharger.

In another embodiment, the engine (e.g., diesel engine) further comprises a charge air cooler operably coupled between a compressor of the turbocharger and the intake manifold, and a charge air cooler cover connected from an outlet of the compressor to an inlet of the charge air cooler. The charge air cooler cover comprises a nozzle connected to the outlet of the compressor for receiving charge air, a tray connected to the inlet of the charge air cooler, and a plenum leading from the nozzle to a plurality of passages defined by a plurality of ribs. The plurality of passages connects the plenum to the tray. The ribs and the tray are arranged to achieve substantially uniform charge air velocity across the inlet of the charge air cooler in at least one mode of operation of the engine.

In embodiments, a charge air cooler cover includes a nozzle configured for connection to an outlet of a compressor for receiving charge air, a tray configured for connection to an inlet of a charge air cooler, and a plenum leading from the nozzle to a plurality of passages defined by a plurality of ribs, the plurality of passages connecting the plenum to the tray. The ribs are arranged to evenly distribute charge air flow among the passages, and the tray is configured to achieve substantially uniform charge air velocity across the inlet of the charge air cooler. For example, the plurality of ribs define the plurality of passages to have differing flow areas, such that the flow area of each passage depends on distance of that passage from the nozzle. For example, the passage furthest from the nozzle is defined to have the largest flow area among the plurality of passages. In certain embodiments, the tray slopes inward from the plurality of passages across the inlet of the charge air cooler, such that substantially uniform charge air velocity is achieved.

In other embodiments, a turbocharger mounting bracket includes a base plate and a flange protruding from the base plate. A lubricant supply passage is formed through the flange, and a lubricant drain passage is formed through the flange. The lubricant supply passage extends from top to bottom of the flange, and may include a slanted portion. In some embodiments, the lubricant drain passage extends from top to bottom of the flange. In other embodiments, the lubricant drain passage extends from the top of the flange to a spigot formed at the side of the flange.

In other embodiments, an engine includes a frame; a plurality of cylinders mounted in the frame, each cylinder connected between an intake manifold and an exhaust manifold; a turbocharger; and a bracket mounting the turbocharger to the frame. The bracket includes a base plate and a flange protruding from the base plate, with a lubricant supply passage formed through the flange and with a lubricant drain passage formed through the flange. The marine diesel engine may also include a charge air cooler cover connected from a compressor outlet of the turbocharger to an inlet of a charge air cooler. Such a charge air cooler cover may include a nozzle configured for connection to an outlet of a compressor for receiving charge air, a tray configured for connection to an inlet of a charge air cooler, and a plenum leading from the nozzle to a plurality of passages defined by a plurality of ribs, the plurality of passages connecting the plenum to the tray. The ribs may be arranged to evenly distribute charge air flow among the passages, and the tray may be configured to achieve substantially uniform charge air velocity across the inlet of the charge air cooler.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. §122, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described charge air cooler cover and turbocharger bracket, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A charge air cooler cover comprising:
   a nozzle configured for connection to an outlet of a compressor for receiving charge air;
   a tray configured for connection to an inlet of a charge air cooler; and
   a plenum leading from the nozzle to a plurality of passages defined by a plurality of ribs, the plurality of passages connecting the plenum to the tray;
   wherein the plurality of ribs are configured to divert, proportion and straighten or collimate a flow of the charge air from the nozzle toward the tray;
   wherein the ribs and the tray are arranged to achieve uniform charge air velocity across the inlet of the charge air cooler; and
   wherein the plurality of ribs define the plurality of passages to have differing flow areas, wherein a first of the plurality of passages furthest from the nozzle is defined to have the largest flow area among the plurality of passages and a second of the plurality of passages closest to the nozzle is defined to have the smallest flow area among the plurality of passages.

2. The charge air cooler cover of claim 1, wherein the plurality of ribs define the plurality of passages to have differing flow areas, the respective flow area of each passage depending on distance of that passage from the nozzle.

3. The charge air cooler cover of claim 2, wherein the passage furthest from the nozzle is defined to have the largest flow area among the plurality of passages.

4. A system comprising:
   an engine;
   a charge air cooler cover having a nozzle configured for connection to an outlet of a compressor for receiving charge air, a tray configured for connection to an inlet of a charge air cooler, and a plenum leading from the nozzle to a plurality of passages defined by a plurality of ribs, the plurality of passages connecting the plenum to the tray;
   a turbocharger operably coupled to the engine and comprising the compressor and a turbine; and
   the charge air cooler, wherein the charge air cooler is operably coupled to receive the charge air from the compressor through the charge air cooler cover;
   wherein the nozzle of the charge air cooler cover is connected to the outlet of the compressor for receiving the charge air, and the tray is connected to the inlet of the charge air cooler; and
   wherein the plurality of ribs are configured to diver, proportion and straighten or collimate a flow of the charge air from the nozzle toward the tray;
   wherein the ribs and the tray are arranged to achieve uniform charge air velocity across the inlet of the charge air cooler; and
   wherein the plurality of ribs define the plurality of passages to have differing flow areas, wherein a first of the plurality of passages furthest from the nozzle is defined to have the largest flow area among the plurality of passages and a second of the plurality of passages closest to the nozzle is defined to have the smallest flow area among the plurality of passages.

5. The system of claim 4, wherein in at least one mode of operation of the system where the charge air cooler cover receives the charge air from the compressor and channels it to the charge air cooler, the ribs and the tray of the charge air cooler cover achieve the uniform charge air velocity across the inlet of the charge air cooler.

6. A system comprising:
   an engine;
   a first turbocharger operably coupled to the engine and comprising a first compressor and a first turbine;
   a second turbocharger operably coupled to the engine and comprising a second compressor and a second turbine;
   a first charge air cooler;
   a first charge air cooler cover having a nozzle configured for connection to an outlet of a compressor for receiving charge air, a tray configured for connection to an inlet of a charge air cooler, and a plenum leading from the nozzle to a plurality of passages defined by a plurality of ribs, the plurality of passages connecting the plenum to the tray, wherein the nozzle of the first charge air cooler cover is connected to the outlet of the first compressor for receiving the charge air, and the tray of the first charge air cooler cover is connected to an inlet of the first charge air cooler;
   a second charge air cooler; and
   a second charge air cooler cover having a nozzle configured for connection to an outlet of a compressor for receiving charge air, a tray configured for connection to an inlet of a charge air cooler, and a plenum leading from the nozzle to a plurality of passages defined by a plurality of ribs, the plurality of passages connecting the plenum to the tray, wherein the nozzle of the second charge air cooler cover is connected to the outlet of the second compressor for receiving the charge air, and the tray of the second charge air cooler cover is connected to an inlet of the second charge air cooler;
   wherein the first charge air cooler cover and the second charge air cooler cover have at least one of a different number of passages, a differently shaped tray or differently shaped ribs from one another.

* * * * *